Aug. 26, 1958 M. F. BECHTOLD 2,848,752
PROCESS FOR THE PRODUCTION OF POROUS OPEN-CELL
STRUCTURE POLYMER FILMS
Filed Dec. 3, 1954
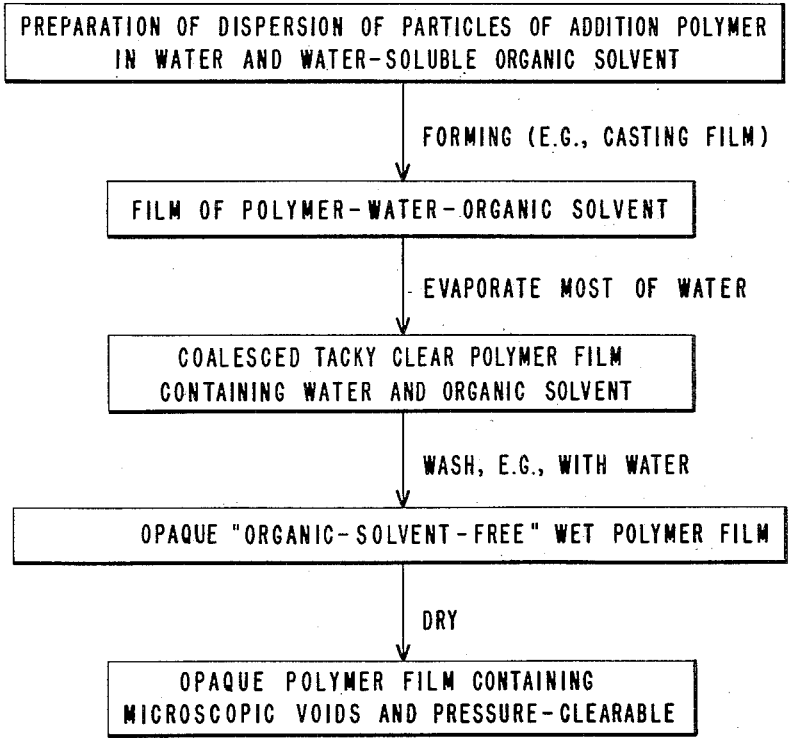
INVENTOR
MAX FREDRICK BECHTOLD
BY Lynn Barrett Morris
ATTORNEY

United States Patent Office 2,848,752
Patented Aug. 26, 1958

---

2,848,752
PROCESS FOR THE PRODUCTION OF POROUS OPEN-CELL STRUCTURE POLYMER FILMS

Max Fredrick Bechtold, Kennett Square, Pa., assignor to E. I. du Pont de Nemours and Company, Wilmington, Del., a corporation of Delaware Application December 3, 1954, Serial No. 473,047

5 Claims. (Cl. 18—57)

This invention relates to a method of producing shaped articles of synthetic hydrophobic vinylidene-type organic polymers that are both porous and opaque. More particularly, it relates to the preparation of porous opaque films from aqueous dispersions of polymers.

This application is a continuation-in-part of my application, Serial No. 383,374, filed September 30, 1953.

Films from organic polymers are often obtained by melting the polymer and extruding under pressure. Many polymers dissolve in solvents to form a solution from which the solvent is removed after casting a coating on a flat surface. Organic solvents and particularly water-insoluble solvents are, in general, used for the casting of films from solutions. There are disadvantages in the latter process since considerable solvent is required to obtain a fluid solution of a high polymer. The cost of the solvent may be high and hazards are generally involved in the use of the undiluted solvent when it is of organic nature. Furthermore, attempts to obtain a solution that is relatively high in polymer content and which contains high molecular weight polymer usually cause degradation of the polymer, e. g., when heat is employed to bring about dissolution of the polymer. Extremely high viscosity is generally developed as the concentration of high molecular weight polymer increases in any solvent. Compromises on either lower polymer content or lower molecular weight polymer in order to attain a viscosity sufficiently low for casting of films, generally give an inferior quality product.

Films obtained from synthetic organic polymers by the above general methods are generally transparent and non-porous. Attempts to obtain opaque films usually involve the addition of opacifying agents, such as inorganic pigments. These agents have not increased the porosity or permeability of the hydrophobic polymer to any substantial degree. Attempts to obtain porous articles have heretofore involved combination of the melt extrusion or solution technique with blowing agents or foaming techniques, which are difficult to control to give reproducible porosity. Actually, any porosity obtained by such methods is generally of the enclosed void type, which does not contribute to permeability. Furthermore, such products do not have much receptivity for ink, nor does pressure cause clarification. Heretofore, no non-pigmented film prepared from a synthetic organic polymer of ethylenically unsaturated monomers has achieved utility as an opaque film of the type afforded by paper.

It is an object of this invention to provide a process for preparing novel films and the like of vinylidene-type organic polymers, which are porous, opaque and non-fibrous. A further object is to produce such opaque films in a form which can be selectively cleared by pressure, heat or solvents, as by printing techniques. Another object is to produce such films which are receptive to ink in a manner similar to paper. Another object is to produce heavy films of vinylidene-type organic polymers in which the properties of porosity, opacity, limpness, toughness and strength are combined to give desirable leather-like properties. Other objects will become apparent from the following description and claims.

There have now been obtained porous, opaque and non-fibrous films of synthetic hydrophobic vinylidene-type organic polymers. Such articles are obtained by a process that involves (1) the preparation of an aqueous dispersion of the polymer containing, based on the weight of the dispersion, from 10% to 50% of a water-soluble organic solvent for the polymer, the solvent being one which boils above 100° C. and being present in a concentration that is insufficient to dissolve the polymer, (2) shaping the dispersion, preferably in the form of a film, (3) removing a substantial amount of the aqueous medium by evaporation from the shaped structure until partial coalescence of the polymer occurs, as indicated by substantial clarification with tackiness, (4) washing the tacky structure with water or a liquid in which the polymer is insoluble but which dissolves the solvent for the polymer to produce a coherent shaped object substantially free from dissolved polymer, followed by (5) washing the resultant shaped article free of organic solvent, after which the article is dried at a temperature below the softening point.

The attached drawing which forms a part of this application, illustrates the process described above by means of a flow sheet.

In the production of films by the above-described process, it has been found that non-fibrous, porous, opaque films are formed which can be selectively cleared, in most cases merely by the application of pressure alone, although the use of heat of solvent is sometimes advantageous. These clearable films have a porous, open-cell structure characterized by microscopic voids communicating with the surface, whereas substantially non-clearable films have a preponderantly closed-cell structure without open voids. These open-cell films have low bulk density and sustain a permanent deformation (reduction in thickness) of at least 20% under a pressure of 10,000 pounds per square inch at room temperature (20°–25° C.). The films of this invention are highly permeable, the permeability to water vapor being about ten times greater than that of corresponding films of the same polymer and thickness which are non-porous or which have closed-cell voids. Of further interest is the fact that the opaque sheets or films of this invention, because of the microscopic void structure communicating with the surface, are receptive to aqueous and non-aqueous ink, irrespective of the specific polymer from which they are made. Thus, they are useful as films or sheets on which writing, typing or printing may be performed, and the product is superior to paper for many purposes.

In the examples, which are given for illustrative purposes only, are shown specific embodiments of this invention. The parts are by weight and all processes were carried out under room conditions unless otherwise stated.

*Example I*

To 5 parts of an aqueous dispersion of polymethacrylonitrile (25.1% solids, average particle diameter about 0.15 micron) was added with stirring 6.7 parts of a 75% solution of tetramethylurea in water. The resultant dispersion was initially highly fluid, but within five minutes thickening occurred to yield a final dispersion of viscosity suitable for casting with a doctor knife. A coating of this dispersion was cast on glass at 15 mils thickness and was dried to a partial degree for one-half hour at room temperature. The coating had clarified and was slightly tacky. The coated panel was immersed in water. The film, which was stripped and washed in water, then was soaked one-half hour in 10% aqueous polyalkylene glycol softener ("Ucon" 50 HB 5100). Next, excess water was removed by squeegee and the film dried at room temperature to yield an opaque, pressure-clearable film of about 5 mils thickness. This film was typed on by an electric typewriter (without a ribbon) to yield clear figures where the type struck, i. e., a negative which was suitable for photoreproduction.

Example II

To 32 parts of a powdered acrylonitrile/isobutylene copolymer containing 25.2 mole percent isobutylene was added 48 parts of water and 100 parts of 75% tetramethylurea in water. This mixture was ball-milled for 44 hours. The resultant dispersion was cast with a doctor knife at 20 mils thickness on glass, coalesced by evaporation until clarification took place and the coating became tacky, then was immersed in water, and the film stripped and washed in water. The film was softened in a 10% solution of ester-type plasticizer ("Flexol" 4GO) in isopropyl alcohol, then dried. The dried and softened film was smooth and opaque. The opaque film was 3.6–5.1 mils in thickness and showed a deformation under pressure of 10,000 pounds per square inch of 25.7% at 24° C. and 42.25% at 50° C. The deformation was determined by change in thickness of a film after pressing between inch square blocks for two minutes in a hydraulic press.

Example III

To 20 parts of a 39.6% solids aqueous emulsion polymerizate of styrene/butyl acrylate (36/4 by weight) was added 40 parts of tert-butyl alcohol. This mixture was ball-milled 16 hours. To 45 parts of the dispersion was added 30 parts of a 50% tetramethylurea solution in water. This mixture was ball-milled for two hours to give a fluid dispersion which was cast at 10 mils thickness on a glass plate and partially dried at room temperature to a clear, tacky coating. One film cast in this manner was washed in water, and then dried to give a highly opaque, glossy film of about 1.5 mils thickness. This film clarified substantially entirely by pressure with a stroke with a dry ball point stylus as well as by heat and to the extent of about 50% transmission at 5500 A. at a pressure of 10,000 pounds per square inch applied at 24° C. Another film cast and partially dried in the above manner was next flushed with dioxane, thereafter washed with water and then dried to give an opaque film grossy on the bottom surface and matte on the top surface. It required slightly higher temperature for complete clarification by heat and was clarified to a smaller extent by pressure than the film prepared without the use of dioxane.

Example IV

To 60 parts of a latex (55.6% solids) of the copolymer of vinyl chloride with a minor amount of ethyl acrylate was added a solution of 60 parts tetramethylurea and 90 parts of tert-butyl alcohol and this mixture was ball-milled for four hours. The resultant dispersion was cast by doctor knife at 10 mils thickness on a ¼ inch polymethyl methacrylate sheet and was dried at room temperature until the coating was clear and tacky. Next, the coating was immersed in water and washed in water for sixteen hours, then withdrawn and dried at room temperature. The coating was opaque, adherent to the polymethyl methacrylate sheeting, and was readily clarified by strokes of stylus instruments, including ball point, pencil and drawing pen points. Straight line and curvilinear figures as well as lettering were obtained as clear lines on the opaque coating on the polymethyl methacrylate sheeting. The resultant "negative" was used for the production of sharp positive photoprints on photographic paper and for the production of photographic transparencies. It also served as an excellent lantern slide for projection of bright line characters where the stylus was used against a dark background (caused by the blocking of the projected light by the non-clarified opaque areas of the slide). The rigid plastic sheet coated with porous, opaque polyvinyl chloride was topcoated with a standard gelatin-silver halide emulsion, exposed to light through a photonegative, then developed in the usual way to obtain a positive photographic print.

Unsupported opaque films were also prepared by the above procedure, except that glass plates were used instead of the polymethyl methacrylate sheeting as the substrate. Immersion of the coating in water resulted in the removal of the film from the glass. After the stripped film was washed and clamped in an open frame and dried at room temperature, an opaque, strong, porous sheet was obtained. This sheet had the following physical properties:

| | |
|---|---|
| Thickness | 1.1–2.3 mils. |
| Bulk density | 0.60 gram/cc. |
| Tensile strength | 1,392 lb./sq. in. |
| Elongation | 40.9%. |
| Modulus | 49,631 lb./sq. in. |
| Tear strength | 2.3 grams/mil. |
| Water vapor permeability | More than 21,000 g. transported per hour at 39.5° C. at 53 mm. pressure differential of water vapor per mil thick film of 100 sq. meters area. |
| Deformation at 24° C | 10% at 500 lb./sq. in. 28.6% at 1000 lb./sq. in. 34.8% at 2500 lb./sq. in. 54.2% at 5000 lb./sq. in. |
| Light transmission | 2% at 4000 A. 3% at 5500 A. 3.5% at 7000 A. |

This film, which is resistant to clarification by moderate impact, was found to be an excellent substitute for paper. It received ink well when typed on with inked ribbon and permitted the formation of very legible carbon copies. It also received aqueous and non-aqueous inks from pens as well as proofing ink and magazine ink applied with a printing plate and a proofing roller.

Thicker opaque films prepared by casting the dispersion at 20 mils had the following physical properties:

| | |
|---|---|
| Thickness | 4.8–5.1 mils. |
| Bulk density | 0.575 g./cc. |
| Tensile strength | 1,282 lb./sq. in. |
| Elongation | 63.6%. |
| Modulus | 51,620 lb./sq. in. |
| Water vapor permeability | 45,418 g./mil thickness. |

Example V

To 60 parts of the vinyl chloride polymer latex of Example IV was added a solution of 60 parts of tetramethylurea in 90 parts of tert-butyl alcohol and 30 parts of china clay. This mixture was ball-milled for four hours and the resultant dispersion was cast at 10 mils thickness on a glass plate and was partially dried until a tacky film was obtained, then immersed in water, washed and dried at fixed area. The resultant opaque film, which had a bulk density of 0.79 g./cc., was still more receptive to inks and more readily marked by pencil than the unsupported film of Example IV, and despite the high loading of clay, could be typed on with an electric powered typewriter with inked ribbon without perforation. The clay-filled opaque film did not accumulate appreciable static charges by friction, was resistant to hot water and would not support combustion.

Example VI

About 100 parts of a fluid dispersion which contained 14.5 parts of a copolymer of acrylonitrile and vinylidene chloride was prepared by the peroxy catalyzed polymerization of 30 parts of acrylonitrile with 50 parts of vinylidene chloride in 120 parts of water in the presence of a dispersing agent. The opaque fluid dispersion (one part) was mixed in a mortar and pestle with 2 parts of a solution of dimethylformamide in tertiary butyl alcohol (50/50). The dispersion was cast at 10 mils thickness on a plate and the film was dried at room temperature until clear and tacky. The film was immersed in water and washed thoroughly and dried. The resultant film was quite thin (28 microns), very opaque (3.05% transmission at 4000 A., 4.1% at 5500 A. and 5.15% at 7000 A.), and underwent a deformation of 47.2% at 10,000 pounds per square inch, with clarification to about 60% transmission at 5500 A. The film was clarified both by impact and by stylus.

*Example VII*

Ten (10) parts of a 39.6% solids butadiene/acrylonitrile latex ("Nitrex" 2612) was mixed with 20 parts of the latex of Example IV and 60 parts of tetramethylurea/tert-butyl alcohol solution were added, followed by ball-milling for two hours. The resultant dispersion was slightly lumpy (due to some precoagula) and slightly more flocculated than desirable. Nevertheless, it was cast at 20 mils thickness on glass, dried partially until appreciable clarification and tackiness developed, then was immersed in water, washed and dried at fixed area. There resulted a thick (6.6 mils), very opaque film of tensile strength 485 lb./sq. in., elongation 1230%, modulus 15,200 lb./sq. in. and a water vapor permeability of 63,000 g./mil thickness. Initial tear strength was very high. This combination of covering power, limpness and toughness makes such films of value in synthetic leather and cloth uses.

*Example VIII*

To 20 parts of a latex containing 50% of a copolymer of vinyl chloride with a minor amount of vinylidene chloride of average particle diameter 0.2 micron was added 40 parts of tetramethylurea/tert-butyl alcohol (1/1 by weight) followed by ball-milling for five hours. The resultant dispersion flocculated. It was cast on glass at 30 mils, although drying caused cracks apparent in the top surface. These healed as the tacky stage appeared, and, after immersion and washing in water, then drying at fixed area, a final( opaque, highly porous film (76% deformation at 10,000 lb./sq. in.) was obtained. The film was 14.4 mils thick and the top side was similar to polished white leather and the bottom side similar to the flesh side of hide in appearance. It is useful as heat and sound insulation.

*Example IX*

To an aqueous dispersion containing 40.9% of a copolymer of styrene/methyl "Cellosolve" acrylate (60/40) was added with mixing in a mortar with pestle a 50/50 mixture of tetramethylurea and tert-butyl alcohol until a dispersion of clusters of primary particles was obtained. At this point, the dispersion was cast at 10 mils on glass, dried until clear and tacky, then washed in water and dried. This film was tough and opaque, and clarified perfectly at 1,000 lb./sq. in. at 37° C., although it would not clarify to a high degree at 10,000 lb./sq. in. at 25° C. A similar film clarified at 625 lb./sq. in. at 40° C.

The use of heat alone to clarify the film showed a two-stage process as temperature increased, the first stage being translucence, then a sudden change to transparency.

*Example X*

A mixture of two aqueous dispersions was obtained from (*a*) 20 parts of a dispersion of a copolymer of styrene with methyl "Cellosolve" acrylate in a 90/10 ratio and containing 39.6% solids and (*b*) 10 parts of a dispersion of a copolymer of styrene with butadiene in a 60/40 ratio and containing 48% solids. The dispersion was mixed with 60 parts of a 50/50 solution of tetramethylurea and tert-butyl alcohol. A final dispersion was obtained after ball-milling for sixteen hours. A film was cast at 10 mils on glass, then dried to an almost non-tacky condition, immersed in water, washed and dried. There was obtained a semi-opaque film, which could be opacified further by drawing. The undrawn area required more pressure (10,000 lb./sq. in.) for complete clarification than the drawn area. Films prepared in this general manner except that initial drying was only to very tacky stage were more opaque but were less easily cleared by pressure.

In general, water-insoluble vinylidene-type addition polymers having a molecular weight of 10,000 or higher are suitable for use in this invention. These polymers are hydrophobic, i. e., they are not dissolved, softened, or plasticized by water under normal conditions, even in the form of gel films. A particular advantage of the process of this invention is that polymers of high molecular weights, e. g., of the order of several hundred thousand, surprisingly, are even more susceptible to use than those of lower molecular weight. The properties of products obtained from the higher molecular weight materials are superior to those formed from lower molecular weight polymers.

Particularly useful polymers are those of vinyl chloride, vinylidine chloride, methacrylonitrile and styrene and copolymers of such monomers and of acrylonitrile with each other or with other monomers such as butadiene, isobutylene and acrylate and methacrylate esters in which the latter monomers are present in minor amounts. An example of a useful copolymer is an acrylonitrile/isobutylene copolymer having 6–30% of isobutylene. The most useful polymers contain major amounts of units of a monovinylidene, particularly a monovinyl monomer such as vinyl chloride, styrene or acrylonitrile.

The dispersions employed in the preparation of the products of this invention are prepared by adding a solution of an organic solvent for the polymer in water, in non-solvent alcohols, such as tert-butyl alcohol, or in a mixture of both, to the aqueous emulsion polymerizate or to a mixture of polymer powder with an aqueous non-solvent medium. Thorough mixing is then effected by any suitable means at a temperature such as room temperature or below, which does not bring about coagulation. Bead-milling, i. e., ball-milling, for a short time with small balls of glass or pebbles is a preferred method of mixing as well as of providing the preferred small size polymer particles. The viscosity of the dispersion can be adjusted with regard to solids content and concentration of non-solvent diluent to provide optimum properties for utilization in the casting of films.

The organic solvents useful in preparing the dispersions are soluble in water to yield 10% solutions, and preferably at least 30–75% or higher solutions. Furthermore, these organic solvents boil above 100° C. and must be by themselves capable of dissolving the polymers at a temperature below the boiling point of the solvent, generally not more than 200° C., and below the degradation temperature of the polymer. Preferably, the solvent is capable of dissolving the polymer at room temperature.

Useful solvents are readily determined by placing 0.1 g. of the finely divided dry polymer in 10 ml. of the organic solvent and stirring the mixture with optional heating and observing whether the polymer passes into solution. Soluble, low molecular weight polymers tend to pass rapidly in solution, while soluble, high molecular weight polymers absorb the solvent and coalesce before slowly passing into solution. Systems in which the polymer is not soluble are not useful for the purpose of this invention.

Solvents that are water-miscible boil above 100° C. and meet the foregoing test of dissolving the polymer are then used in the preparation of the coalescible dispersions. For this purpose, the concentrations of the solutions are kept below those at which the polymer will pass into solution at the temperature of preparation of the casting dispersion, as described above.

The specific solvent employed depends upon the particular polymer used and the preferred solvents are determined by means of the test described above. Useful solvents are alkylated amides such as tetramethylurea, dimethylformamide, diethylacetamide, and diethylformamide. Tetrahydrofurfuryl alcohol, triethyl phosphate and propylene carbonate have also been found useful.

Tetramethylurea is a preferred solvent for the purpose of this invention. Mixtures of tetramethylurea with an alcohol, such as tert-butyl alcohol or with water are frequently preferred to avoid coagulation of polymer particles by solvent action.

The dispersions are therefore readily prepared by mixing finely divided polymer with the solvent-water media in the amounts desired. The dispersed polymer should initially have a particle size less than about 3 microns, preferably 0.005–1.5 microns, sizes in the range of 0.05 to 0.5 micron giving especially desirable results. Such sizes are obtained by mechanical means, such as by the use of micronizers, homogenizers, ball mills, and similar pulverizers if the polymer used is not already in a finely divided state. If the polymer particles are within this size as obtained from dispersion polymerization, simple shaking or stirring is sufficient to give good dispersions.

Suspensions of appropriately fine polymer as obtained from emulsion polymerization processes in aqueous media can be employed directly. In fact, the use of such aqueous dispersions is a preferred embodiment of this invention. The use of such permits the preparation of the opaque films without isolation of the polymer or removal of minor amounts of unreacted monomers, dispersing agents, etc. The dispersions of this invention are prepared at any convenient temperature that does not cause polymer solution or degradation, preferably at 0–40° C. Mixed dispersions of various polymers and copolymers may also be used, preferably those polymers that are compatible in the final film. Fibrous and non-fibrous fillers, e. g., dyes, clay, silica, flame inhibitors, pigments, dispersing agents, etc., may also be added to change the texture, flammability and strength properties of the final films. However, these are incidental to and are unnecessary for the opacity and porosity of the films produced, which are inherent in the process of this invention. Large amounts of such fillers can make the clarification stage more difficult to observe. The preferred dispersions employed in coating can contain clusters of polymer particles of up to 20 times the size of the original polymer particles.

The dispersions employed in this invention are generally stable against aging or are readily returned to homogeneous casting condition by mild agitation. These dispersions contain from 10% to 50% of solvent, 5% to 60% water, and up to 60% of a water-miscible diluent by weight. The amount of polymer dispersed therein is generally from 2% to 30% by weight. The preferred dispersions (those which give superior properties in the shaped products prepared therefrom) have a polymer to solvent ratio of 1/1 to 1/10 and polymer to water ratio of 2/1 to 1/10. The water to solvent ratio is generally from 2/1 to 1/3. In choosing the particular concentration, one will, of course, avoid combinations which would give solutions at room temperature rather than dispersions.

Upon removal by evaporation of sufficient water and any other non-solvent liquid diluent present from the solvent at a temperature at which the polymer is soluble, the polymer particles start to coalesce. This coalescence, which is probably due to change of the surface of the dispersed polymer particles to the solution state, is marked by an abrupt change from an opaque milky or paste-like stage to a hazy to substantially clear material which is extremely viscous (syrupy) or is tacky and rubbery. The molecular weight and concentration of the dissolved polymer determine the properties of the coalesced material. For maximum capacity and porosity in the final film, evaporation is discontinued after coalescence (clarification), but while the film is in tacky stage. This is readily determined by test with the finger.

The dispersions obtained are readily fluid, especially when the polymer concentration is less than about 25% by weight. They are readily employed in the preparation of shaped objects such as films and fibers. The steps involved in the preparation of shaped objects from the polymer dispersion include the shaping of the dispersion in substantially the desired form such as casting it on a plate in a thin layer for the preparation of a film or by wiping it into grooves on a wheel or belt or by extrusion through a spinneret onto a firm substrate for the preparation of a fiber. Up to this stage, the dispersion is a milky fluid of relatively low viscosity. Partial drying (evaporation of water) converts the fluid to a milky paste-like system. It is "immobilized" by this drying and the primary particles of the dispersion appear in clusters of sizes of 4–20 or more times their original size. The next step is the coalescence operation in which the milky paste-like coating is transformed into a more transparent, tacky, shaped object. This step is accomplished by the further evaporation of most of the water and any other non-solvent diluent from the dispersion. While room temperatures or lower can be used, it is generally preferred that heat, e. g., temperatures of the order of 70–175° C., be employed momentarily in transformation of the fluid dispersion to a transparent, coherent film or fiber since the time is much less. This is particularly necessary when a high speed, continuous process is employed in the preparation of films and fibers and it is desired that the coalescence step consume a time of the order of a few seconds. It is also necessary for polymers of high minimum solution temperature. With short contact times, the actual temperature achieved is relatively immaterial with respect to the degradation of polymer. It is, however, very important that the coalescence be stopped in the tacky stage. The next step involves the separation of the shaped polymer phase from the solvent system and the subsequent removal of substantially all of the solvent. Water is the liquid of choice for this step, especially for the most hydrophobic polymers, although alcohols or aqueous alcoholic solutions are sometimes useful. The liquid of choice is one that in small concentrations destroys the ability of the solvent to dissolve the polymer, and thus fixes the dimentions of the film as opposed to leaching out the polymer solvent accompanied by retraction of the polymer to destroy the void structure. In other words, this step involves the use of compouds which are non-solvents for the polymer but readily dissolve and destroy the solvent power of the organic liquid employed as the polymer solvent. Water-miscible liquids (including water) which are effective for the reduction of solvent action of the solvent, i. e., separation of the polymer as a coherent shaped phase from the polymer-solvent combination, are readily determined by dropping a small portion of the shaped object into an excess of the water-miscible liquid. The polymer should set up at once in the liquid and become opaque. The washing step generally requires times of the order of a few minutes to several hours, depending on the specific polymer-solvent combination. High opacity is obtained in films which are solvent free or which retain, at most, a few percent of solvent. The resulting polymer structure, e. g., film, is then dried at a temperature below the softening point of the polymer. In some instances, the final opacity of films may be intensified by the used of a wash liquid of lower surface tension than water, for example, isopropyl alcohol, as a wash for the polymer film just prior to drying.

Plasticizers or softening agents can be included to an extent of 5–10% of the polymer in the final bath. It is also possible to impregnate the film before drying by the use of dyes, and heat-setting polymer solutions, etc., in the final bath.

The opaque films of this invention have also been obtained by an alternate process. This comprises the formation of a clustered dispersion, for example, from a polyvinyl chloride dispersion in aqueous cyclohexanol, casting and partial evaporation to a non-flowable, crack-free condition. In this situation, only a slight clarification occurs during evaporation and tackiness does not develop even on heating to remove the non-solvent dispersion medium. A liquid polymer solvent, such as dioxane, is next applied by immersing or flooding the coating with it. Removal of solvent by washing is conducted immediately without additional evaporation. After washing and drying, a film is obtained with unusually high strength, opacity and porosity and which has a matte top surface which is less glossy than obtained by the usual process. The film has high ink receptivity. The separation and recovery of organic dispersion media from polymer solvent media is simplified by this process, which is also applicable to polystyrene as shown by the following detailed description of an embodiment of this technique.

To 20 parts of a 38.2% polystyrene (particles of which ranged from 0.016 to 0.11 micron, average 0.08 micron in diameter) aqueous dispersion was added 10 parts of a 44.9% butadiene/styrene copolymer aqueous dispersion of approximately 50% styrene content, 4 parts of para-tert-amylphenoxyethanol (a softener) and 35 parts of tert-butyl alcohol. This mixture was ball-milled sixteen hours to yield a fluid, but thixotropic dispersion. This dispersion was cast at a thickness of 10 mils on a glass plate. The coated plate was placed in an air oven at 50° C. until partial coalescence but not tackiness had occurred. After being cooled to room temperature, the coated plate was flushed with dioxane and then immediately with water. Finally, the coating was stripped, washed in water and dried. The resultant opaque film was 2.1 mils thick and was clarified by applying 10,000 lb./sq. in. pressure at 24° C. with a permanent deformation of 20.4%. The resultant change in transmission at various wave lengths was 0.75% to 45% at 400 A., 1.8% to 63.2% at 5500 A., 2.5% to 72.75% at 7000 A. It was found that at 65° C., 5,000 lb./sq. in. was adequate to clear the opaque film to about 90% transmission of light at 5500 A. (Light transmission measurements were made with a General Electric recording spectrometer.) Similar films at 1.55–1.75 mils thickness had a water vapor permeability of 5,000 g./mil, a tensile strength of 896 lb./sq. in., an elongation of 46.9% and a modulus of 69,000 lb./sq. in. Several other polymer solvent-precipitant treatments used in place of dioxane-water also resulted in opaque, pressure-clearable films, such as acetone-water, ethyl acetate-ethyl alcohol, ethyl methyl ketone-water, and methyl isobutyl ketone-ethyl alcohol.

By this invention, the difficulties of fabrication from solutions or melts of high molecular weight polymers such as balling up, high viscosities and chemical degradation are avoided, since the dispersions employed in this invention are quite fluid. Furthermore, the dispersions can be, and preferably are, concentrated with respect to the amount of polymer present. A further advantage of the process of this invention is that isolation of polymer, when it is prepared as an aqueous dispersion, is not required.

The films obtained by the process of this invention are strong, generally opaque and have a thickness of 0.5–50 mils. Those of thickness of 1–5 mils are particularly useful as paper substitutes while thicker films are useful as porous substitutes for leather. Those of moderate opacity are useful as a tracing paper for reproduction of maps, drawings, etc., by superposing the film on an original and copying by a stylus. Because of their higher opacity at 4000 A. than at visible wave lengths, the resultant clear line drawing on the translucent film is suitable as a negative for photoprinting normally conducted by exposure to light in the vicinity of 4000 A. The films can also be selectively cleared by the action of heat, such as infrared, and by the application of polymer solvents by pen. A further use of these films is for the production of several copies of typed (without ink ribbon) material without the use of carbon paper. The films also accept ink readily and those resistant to clarification by slight impact, such as shown in Examples IV and V, are superior paper substitutes. These films are advantageous over conventional papers in their opacity per unit thickness without fillers. Films from chlorine-containing polymers are generally difficult to burn. The films generally have high strengths when wet as well as dry and are relatively stable in dimensions. They are also useful as insulation, artifical leathers, textile-like films, light diffusing coatings and panels, acoustic paneling, dielectric spacers, wall paper, and when coated with adhesive, they are useful for medical bandages and pressure-clearable labeling tapes.

The opaque, porous films of the hydrophobic polymers have a bulk density that is considerably less than for the polymer in clear form (generally not more than 75% of the usual density). The opaque and non-fibrous films contain generally about 20–80%, preferably 35–65%, by volume of open-cell pores. The films have a water permeability of at least 4,000 grams (as described in Example IV). The films at a thickness of 3 mils have a light transmission of less than 10% at 4000 A. and generally less than 5%.

Since many different embodiments of the invention may be made without departing from the spirit and scope thereof, it is to be understood that the invention is not limited by the specific illustrations except to the extent defined in the following claims.

What is claimed is:

1. A process for the production of porous open-cell structure polymer films which comprises (1) preparing a dispersion of discrete particles of a hydrophobic organic addition polymer having a wholly carbon chain of atoms, a molecular weight of at least 10,000 and a particle size less than 3 microns and being taken from the class consisting of vinyl and vinylidene addition polymers in an aqueous medium containing from 10% to 50% by weight of a water-soluble organic solvent for said polymer and having a boiling point above 100° C. and at a concentration insufficient to dissolve the polymer, (2) shaping the dispersion into the form of a film, (3) removing a substantial amount of the aqueous medium from the shaped film by evaporation until the polymer film becomes tacky, (4) washing the resulting tacky film with a water-miscible liquid in which the polymer is insoluble but which dissolves said organic solvent to form a porous opaque and coherent film substantially free from said organic solvent and (5) drying the washed film at a temperature below its softening point to produce a strong, opaque article having a porous, open-cell structure characterized by microscopic voids communicating with the surface and receptive to ink.

2. A process as defined in claim 1 in which the dispersed polymer has an initial particle size of 0.005 to 1.5 microns.

3. A process as defined in claim 1 in which the dispersion contains from 5% to 60% water and up to 60% of a water-miscible diluent.

4. A process as defined in claim 1 in which the dispersion contains from 2% to 30% of polymer.

5. A process as defined in claim 1 in which the polymer to solvent ratio is from 1:1 to 1:10 and the polymer to water ratio is from 2:1 to 1:10 in the dispersion.

References Cited in the file of this patent

UNITED STATES PATENTS

| | | |
|---|---|---|
| 2,385,920 | Jenkins | Oct. 2, 1945 |
| 2,559,752 | Berry | July 10, 1951 |
| 2,612,485 | Baer et al. | Sept. 30, 1952 |
| 2,618,580 | Lancaster | Nov. 18, 1952 |
| 2,627,088 | Alles et al. | Feb. 3, 1953 |
| 2,681,319 | Bodamer | June 15, 1954 |
| 2,681,320 | Bodamer | June 15, 1954 |
| 2,707,805 | Smith et al. | May 10, 1955 |
| 2,710,426 | Platzer et al. | June 14, 1955 |
| 2,739,909 | Rosenthal | Mar. 27, 1956 |

UNITED STATES PATENT OFFICE
CERTIFICATE OF CORRECTION

Patent No. 2,848,752                                  August 26, 1958

Max Fredrick Bechtold

It is hereby certified that error appears in the printed specification of the above numbered patent requiring correction and that the said Letters Patent should read as corrected below.

Column 3, line 39, for "grossy" read -- glossy --; column 4, line 8, for "1.1" read -- 1.7 --; column 5, line 37, for "final(" read -- final, --; column 8, line 61, for "used" read -- use --; column 9, line 32, for "400" read -- 4000 --.

Signed and sealed this 23rd day of December 1958.

(SEAL)
Attest:

KARL H. AXLINE                                            ROBERT C. WATSON
Attesting Officer                                       Commissioner of Patents